Dec. 22, 1931.   H. A. SILVEN ET AL   1,837,342
WORK SUPPORTING MECHANISM FOR GRINDING MACHINES
Filed Nov. 7, 1928    2 Sheets-Sheet 1
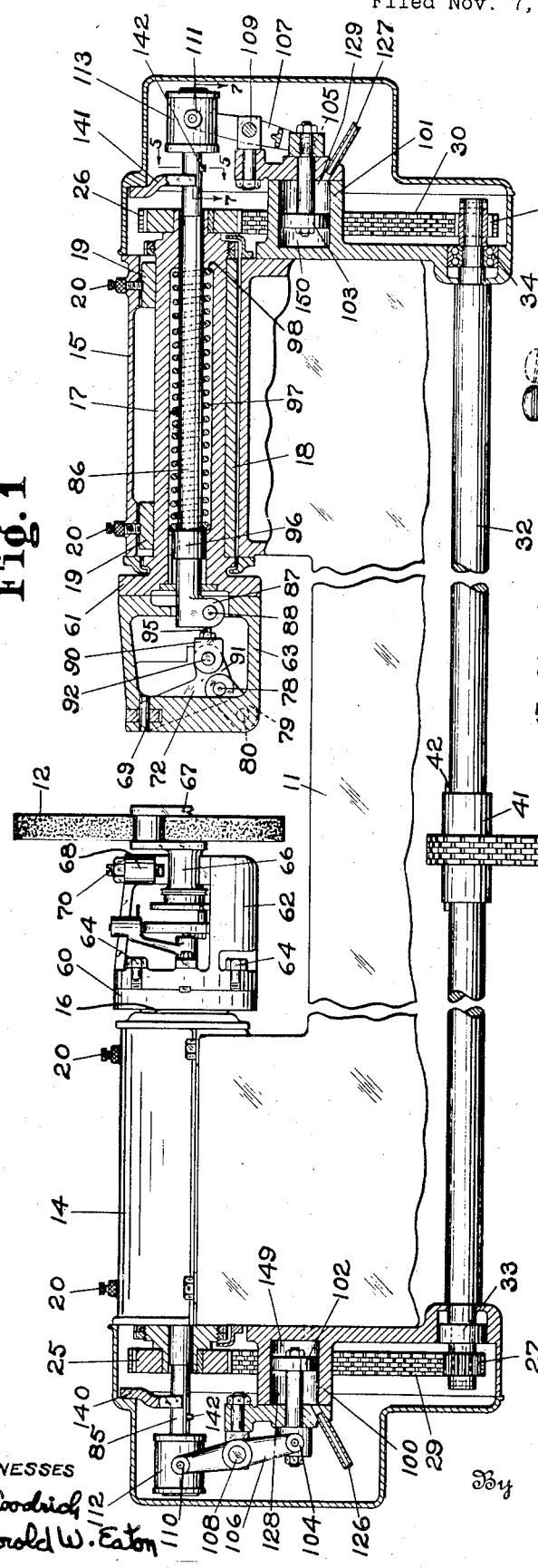
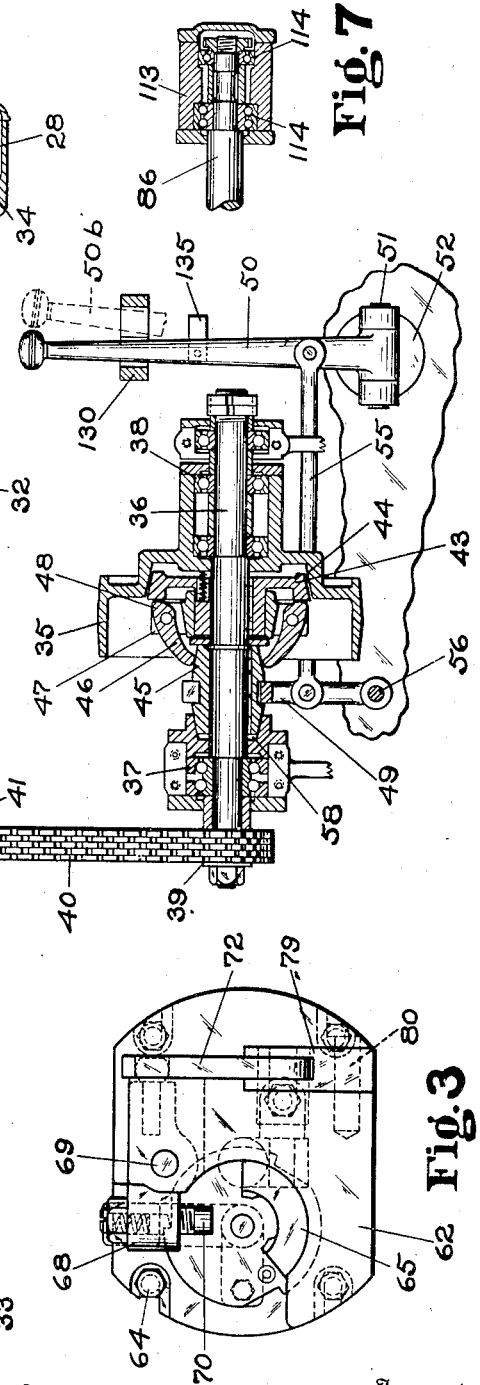
Inventors
HERBERT A. SILVEN
ALBERT G. BELDEN
By Clayton L. Jenks
Attorney

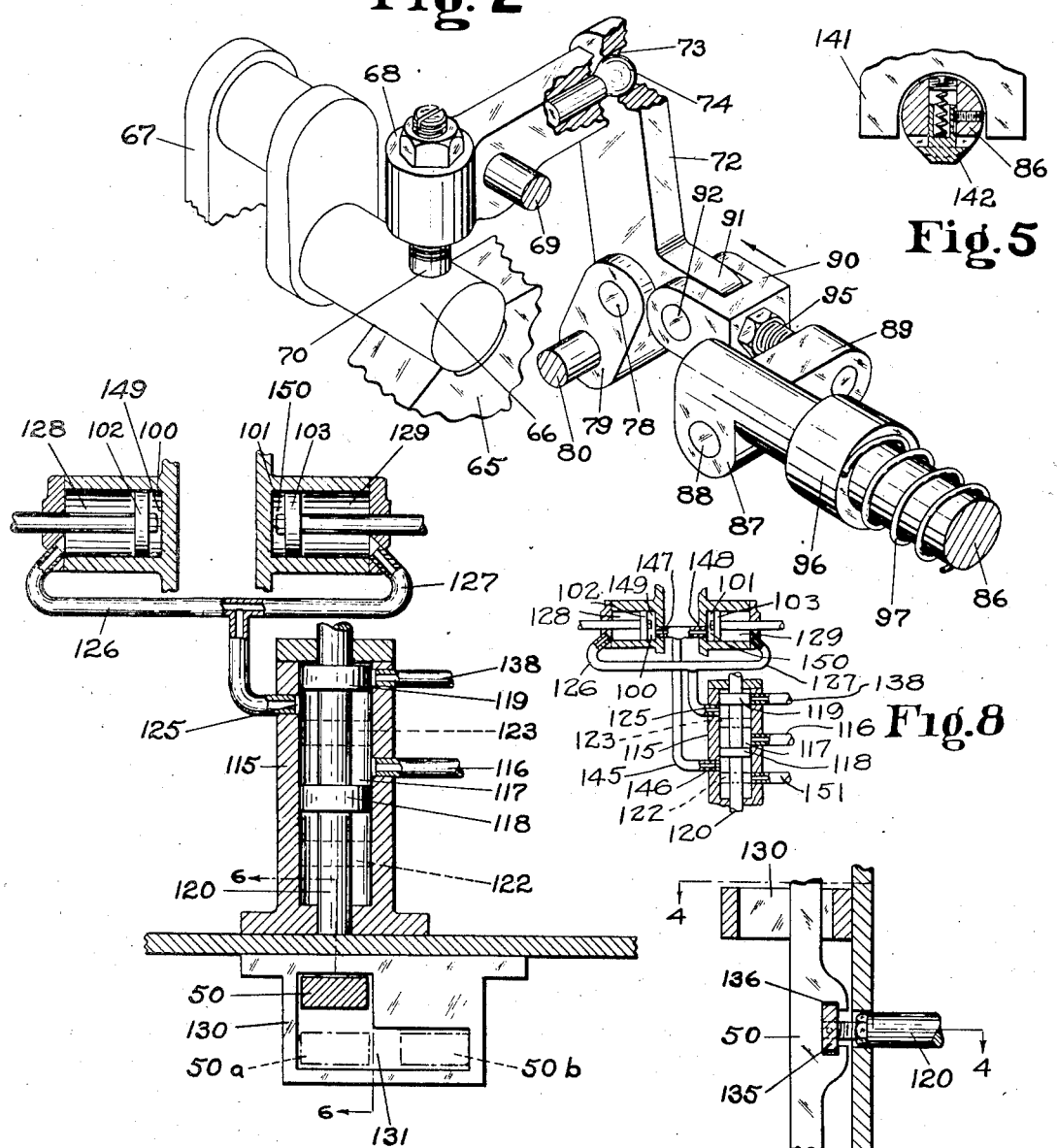

Patented Dec. 22, 1931

1,837,342

UNITED STATES PATENT OFFICE

HERBERT A. SILVEN AND ALBERT G. BELDEN, OF WORCESTER, MASSACHUSETTS, ASSIGNORS TO NORTON COMPANY, OF WORCESTER, MASSACHUSETTS, A CORPORATION OF MASSACHUSETTS

WORK SUPPORTING MECHANISM FOR GRINDING MACHINES

Application filed November 7, 1928. Serial No. 317,820.

This invention relates to grinding machines and more particularly to a work holding and clamping mechanism capable of use in machine tools, such as a double-head grinding machine for crankshaft grinding and the like.

Heretofore various mechanisms have been employed for clamping a crankshaft in a double-head machine so that the drive between the two heads might be equalized to avoid any undue torsional strains of the shaft during the grinding operation. These mechanisms have comprised manually operable clamping devices so constructed as to necessitate the operation of swinging a clamping member into place and then turning a clamping bolt or nut by means of a suitable wrench to lock the shaft in position on the work head. Likewise, after the grinding operation the operator had to slack-off on the clamping bolt or nut and swing the clamping member out of place before he could lift the shaft out of the machine and replace it with a shaft. This required considerable time on the part of the operator and reduced the productive output of the machine.

It is the principal object of this invention to eliminate this difficulty and to provide a clamping mechanism which is mechanically operated with a minimum amount of attention on the part of the operator, thereby increasing the production per machine.

It is a further object to provide a suitable mechanism for clamping the work piece in place by a yieldable mechanism arranged to exert a definite pressure upon the work piece so as to insure the work being securely clamped in place for the grinding operation, and particularly to provide a mechanism which tends to clamp the work piece automatically but which may be released mechanically at the will of the operator.

In previous mechanisms there has been no cooperation between the clamping mechanism and the control for the work rotation. With the ordinary type of clamping mechanism, such as has heretofore been used in crankshaft grinding, the operator had to first clamp the shaft in place and then as a second operation start the work rotation before the grinding wheel could be brought into contact with the work. If, for any reason, the operator did not securely clamp the crankshaft in place before starting the work rotation, the loosely clamped shaft might cause injury to the grinding wheel and machine as well as the products being ground, and also endanger the life of the operator. Also, if the work support were located in an inverted position when the clamping jaw was released, the work would fall from its support; hence it is desirable, in a machine which has a mechanically operated clamping device, to so construct the mechanism that the work cannot be released except when properly supported.

It is a further object of this invention to overcome this difficulty and to provide an interlocked arrangement of the control for the work clamping mechanism and the clutch which controls the starting and stopping of the work rotation.

It furthermore is an object to provide a mechanism which cannot be operated to release the work from its support when it is so positioned that it would fall from the clamping support.

As shown in the drawings, one embodiment of the invention has been illustrated in which like reference numerals indicate like parts:

Fig. 1 is a fragmentary view partly in section to shown the operating mechanism;

Fig. 2 is a fragmentary perspective view on an enlarged scale of the clamping means;

Fig. 3 is an end view of one of the work clamping heads on an enlarged scale and showing the indexing mechanism for the crankshaft;

Fig. 4 is a fragmentary sectional view taken approximately on the line 4—4 of Fig. 6, showing the operating valve together with the connections to the cylinder mechanism on the work heads;

Fig. 5 is a fragmentary detail view showing a safety device which prevents unlocking the clamping device when the work holders are in an inverted position;

Fig. 6 is a fragmentary detail view taken approximately on line 6—6 of Fig. 4 showing the connections between the control lever and the valve stem;

Fig. 7 is a detail longitudinal sectional view taken approximately on the line 7—7 of Fig. 1, showing the thrust bearing connections between the clamp operating member and the actuating mechanism; and Fig. 8 is a view similar to Fig. 4 on a reduced scale showing the double acting piston arranged for actuating the work clamping members.

This invention provides an automatic clamping mechanism for a grinding machine, such as crankshaft grinding machines and the like and which is particularly useful in a double-head grinding machine in which the head and foot stocks are each provided with a clamping mechanism to support and rotate the work during the grinding operation. In the form illustrated, a clamping device for holding the work during rotation may comprise a rotatable holding member and a clamping jaw which is moved into engagement with the periphery of an end of the work by a power mechanism controlled by the operator. The clamping jaw may be moved by a spring actuated mechanism into engagement with the work, and it may be released by a fluid pressure device. The work is positively rotated by a clutch controlled mechanism and in order that the clamping jaw may not be released until the work rotation has been stopped, and vice versa, the control mechanisms for the clutch and the clamping jaw are so interlocked or arranged that they must be operated in a definite sequence. Also, the jaw cannot be released, because of a locking device, unless the holding member is in such a position as to support the work when the jaw is out of contact therewith.

The double-head crankshaft grinding machine illustrated in the drawings comprises a work supporting table 11 which is adapted to slide on suitable ways on the machine base (not shown) and adapted to support the work blank in operative relation with a grinding wheel 12 which may be mounted on any of the old and well-known types of wheel slide. The wheel slide is provided with any suitable feed (not shown) mechanism so that the grinding wheel may be fed into the work to grind the same to the desired size. The work table 11 is provided with a pair of work supporting heads 14 and 15 which as illustrated may be made integral with the table 11 or if preferred may be bolted rigidly to the table and provided with a suitable adjustment so that the heads may be moved laterally of the table to align the axis of one head with the axis of the other.

The heads 14 and 15 are provided with work supporting spindles 16 and 17 journalled in the partial bearings 18 and provided with floating bearing members 19 which may be adjusted relative to the fixed portion of the bearings by screws 20. For further details of this bearing construction together with the drive for the spindles, reference may be had to the United States patent to Norton No. 1,563,310 of November 24, 1925.

The work supporting spindles 16 and 17 are provided at their outer ends with sprockets 25 and 26 respectively which are in turn connected with sprockets 27 and 28 by link driving chains 29 and 30. The sprockets 27 and 28 are mounted on a drive shaft 32 mounted in suitable bearings 33 and 34 depending from the work table 11. It will be seen from this construction, that any rotation of the shaft 32 will be transmitted through the sprockets and chains to drive the work supporting spindles 16 and 17 in synchronism. The shaft 32 may be driven by any suitable clutch controlled mechanism. This comprises a pulley 35 rotatably mounted on a shaft 36 which is supported in suitable bearings 37 and 38 in the machine base. A sprocket 39 is mounted on the outer end of the shaft 36 and is in turn connected by a link chain 40 to a sprocket 41 which is slidably keyed to the shaft 32. This sprocket 41 is provided with a key 42 so that the sprocket may be held against endwise movement as the table 11 and shaft 32 reciprocate but at the same time permits rotation of the shaft 32 to drive the work spindles 16 and 17.

It is desirable in a machine of this type to provide some control mechanism for stopping and starting rotation of the work spindles. In the preferred construction, a clutch mechanism may be provided, such as a friction clutch of an old and well known type. This clutch comprises a cone-shaped member 43 which is slidably keyed to the shaft 36 and is adapted to engage a correspondingly shaped aperture 44 in the pulley 35. A cone-shaped sleeve 45 is slidably keyed on the shaft 36 and is adapted to engage the ends of the long arm of a plurality of clutch fingers 46. The clutch fingers are pivotally mounted on a supporting member 47 and arranged so that the short arms 48 engage one face of the cone-shaped member 43. It will be readily apparent from this construction, that when the sleeve 45 is moved toward the right as viewed in Fig. 1, the fingers 46 are swung about their pivots and operate to slide the cone-shaped member 43 into engagement with the aperture wall 44 to lock the pulley 35 to the shaft 36 and thereby start rotation of the spindles 16 and 17. A yoked member 49 engages an annular groove in the sleeve 45 so as to control the engaging or disengaging of the clutch. In order that the clutch sleeve 45 may be readily controlled, a manually operable lever 50 is pivotally mounted on the stud 51 so that the lever may be swung in a vertical plane toward and from the machine base. The stud 51 is supported on a pivot 52 so that the lever may be swung in a vertical plane substantially parallel with the ways of the machine. The lever 50 is connected by a link 55 to the yoked member 49 which is pivotally mounted on a stud 56 so that any movement of the lever 50 longitudinally of the machine is transmitted to engage or disengage the clutch. If the lever 50 is thrown toward the right, into a position as illustrated in dotted lines in Fig. 1, then the clutch operating sleeve 45 is moved toward the right to engage the clutch member and lock the pulley 35 to the shaft 36, thereby transmitting power to the spindles 16 and 17. If the operator moves the lever toward the left, into the position as indicated in Fig. 1, then the sleeve 45 is moved toward the left and into engagement with a cone-shaped aperture wall 58 which is fixed on the machine base. The cone-shaped sleeve 45 is slidably keyed on the shaft 36 so that when it comes into engagement with the cone-shaped aperture wall 58, it will serve as a brake to stop the rotation of the work supporting spindles.

A semi-automatic clamping mechanism is utilized, which will rigidly lock the shaft in place during grinding. As illustrated, the inner ends of the spindles 16 and 17 are provided with enlarged face plate portions 60 and 61 to which the work supporting and clamping heads 62 and 63 are secured by means of bolts 64. Each of the heads 62 and 63 is provided with a fixed partial bearing member 65 adapted to support one of the main bearings 66 of a crankshaft 67. The surface of the bearing member 65 is arranged to support and align the shaft for grinding. A lever 68 is pivotally mounted on a stud 69 on the work heads 62 and 63 and is provided at its outer end with a projecting stud 70 which is threaded within the end of the lever 68 to permit adjustment of the stud relative to the lever. It is readily apparent from this construction that when the lever 68 is rocked about its pivot 69, the stud 70 is swung into engagement with the periphery of the work and the shaft is held rigidly in position on the bearing member 65.

In the preferred construction, a toggle is provided to swing the lever 68 and to lock the crankshaft in rigid engagement with the work supporting and rotating head. This may comprise a bell crank lever 72 which is provided with an aperture 73 at its upper end adapted to loosely engage a spherically shaped projection 74 on the lever 68. The lower end of the lever 72 is pivotally mounted on a stud 78 secured on the link 79 which is in turn pivoted on a stud 80 in the work head member 62. It will be readily apparent from this construction, as illustrated in Fig. 2, that as the lever 72 is moved in the direction of the arrow, the pivot 80 being fixed, it will tend to raise the spherical projection 74 on the end of the lever 68 and swing the lever 68 about its pivot 69 to bring the stud 70 into engagement with the bearing 66 on the crankshaft 67 to hold the shaft rigidly in contact with the bearing member 65.

The toggle is preferably operated by a spring actuated mechanism to permit rotation of the work without disturbing the connections of the adjustment or operation of the clamping mechanism. As illustrated, rods 85 and 86 are provided which pass through central apertures in the spindles 16 and 17 respectively. The inner end of each rod 85 and 86 is provided with a projecting portion 87 supporting a stud 88 which in turn supports the member 89. The member 89 is pivotally connected by a yoked member 90 to the short arm 91 of the bell crank lever 72 by stud 92. A screw threaded connection 95 is provided between the yoked member 90 and the member 89 so that the operator may readily adjust the position of the stud 92 relative to the operating mechanism. The rods 85 and 86 are each provided with an enlarged portion 96 which is adapted to act as a thrust receiving member for one end of spring 97 interposed between the enlarged portions 96 on the rods 85 and 86 and shoulder 98 in the aperture in spindles 16 and 17 respectively. The portion 96 of the shafts 85 and 86 are slidably keyed to the aperture in the spindles 16 and 17 so that the shafts rotate with the spindles but are permitted to slide longitudinally thereof to operate the work clamping mechanism. It will be readily seen from this construction that the spring 97, which is of sufficient tension to exert the desired pressure to hold the crankshaft in the work supporting head, will exert a pressure on the spindle toward the work supporting head and thereby operate the toggle and simultaneously lock the end of the crankshaft in rigid engagement with the supporting member.

In order that the crankshaft may be readily unlocked after the grinding operation, a fluid actuated mechanism is provided so that the clamping members may be quickly unlocked to permit removal of the finished shaft and replacement thereof with a minimum amount of effort and loss of time by the operator. This mechanism may comprise a pair of cylinders 100 and 101 rigidly mounted on opposite ends of the table 11 and having pistons 102 and 103 operatively connected to the lower yoked ends 104 and 105 of levers 106 and 107 respectively. The levers 106 and 107 are pivotally mounted on the studs 108 and 109 which are in fixed relation with the work supporting heads. The upper ends of these levers are formed yoked projections 110 and 111 which straddle and are connected to the members 112 and 113. The members 112 and 113 are in turn rotatably supported by ball thrust bearings 114 on the outer end of the rods 85 and 86 to permit the spindles 16 and 17 and rods 85 and 86 to rotate and at the same time be given an endwise movement to lock and unlock the work supporting members.

A suitable valve 115 is provided to control the flow of fluid under pressure to actuate the piston. Fluid under pressure may be admitted to the valve 115 from any suitable well known fluid pressure source through the pipe 116 which enters the valve chamber 117 between the pistons 118 and 119 on the valve stem 120. This valve is of the balanced piston type arranged so that fluid entering the chamber 117 equalizes the pressure on each piston and permits a ready adjustment of the valve without undue exertion on the part of the operator. When the valve stem 120 is moved outwardly so that the pistons 118 and 119 assume the dotted positions 122 and 123 respectively, the port 125 is opened and fluid under pressure is permitted to pass through pipes 126 and 127 into the cylinder chambers 128 and 129 thereby moving the pistons 102 and 103 toward each other to swing the levers 106 and 107 and move the rods 85 and 86 outwardly against the tension of the springs 97 to operate the toggles and thereby unlock the work clamps to release the crankshaft after the grinding operation has been completed.

It is desirable that the work clamping mechanism and the clutch controlling the work rotation be so connected or interlocked that the rotation of the work head cannot be started until the crankshaft is rigidly held in operating position. Likewise, when grinding has been completed, the rotation of the work heads should be stopped before the clamping members may be unlocked. To accomplish this, a lever controlling member 130 is provided for the lever 50. This member 130 is fixed to the base of the machine and is provided with a substantially L-shaped opening 131 which permits the lever 50 to be swung in a plane parallel with the work supporting spindles and also in a plane at right angles to said spindles. The valve stem 120 is connected to the lever 50 by means of a block 135 which is fixed to the stem 125 and is slidably mounted in a T-shaped slot 136 in the lever 50 thereby permitting a longitudinal swinging of the lever as well as a movement axially of the valve stem 125.

When the lever 50 is in the position illustrated in full lines in Figs. 1 and 4, the clutch 45 is disengaged, the spindles are stationary and the clamping mechanism unlocked. When the crankshaft is inserted in position on the partial bearing member 65, the operator moves the lever 50 into a position 50a, as shown in broken lines in Fig. 4, to move the valve stem 120 and pistons 118 and 119 into a position shown in the dotted lines as 122 and 123. This movement closes the ports 125 and prevents further admission of fluid into the cylinder chamber. When the piston 119 passes by and cuts off the port 125, the released tension of the springs 97 operating against the fluid in the cylinders, forces the fluid from the cylinder chambers 128 and 129 and exhausts it through pipes 126 and 127, port 125 and pipe 138. As the tension of the springs 97 is released, by the exhaust of the fluid, the rods 85 and 86 are moved inwardly to operate the toggles and thereby swing the clamping lever 68 so that the studs 70 lock the crankshaft securely in position. The operator may then swing the lever 50 from position 50a toward the right into position 50b, as viewed in Figs. 1 and 4. This movement of lever 50 slides the clutch sleeve 45 toward the right to lock the pulley 35 to the shaft 36 and thereby start rotation of the spindles 16 and 17.

Similarly after the grinding operation is completed, the operator moves the lever 50 from the position 50b, as illustrated in broken lines in Figs. 1 and 4, into position 50a thereby moving the sleeve 45 towards the left to contact with an aperture wall 58 to brake and stop the rotation of the spindles 16 and 17. After the rotation of the spindles has been stopped, the operator may swing the lever 50 from the position 50a (Fig. 4) into position 50, as shown in full lines, to move the valve stem 20 and valve pistons from the dotted position 122 and 123 into the position as shown in full lines 118 and 119. This permits fluid under pressure to pass through the pipe 116 into the valve chamber 117 and through the ports 125 and pipes 126 and 127 into the cylinder chambers 128 and 129 of the cylinders 100 and 101 respectively. The fluid under pressure in chambers 128 and 129 moves the pistons 102 and 103 towards each other which operates to move the rods 85 and 86 away from each other against the tension of the springs 97 to operate the toggle and unlock the crankshaft after grinding.

It is desirable that the clamping members be unlocked only when the bearing members 65 of the work heads 62 and 63 are in an upright position. To prevent the unlocking of the clamping member 70 when the bearings are in an inverted position, a safety device is provided including the yoke-shaped members 140 and 141 which are secured to the heads 14 and 15 and straddle the rods 85 and 86 respectively. The rods 85 and 86 are provided with a spring pressed projection 142 which projects from the periphery of the shaft. This projection is on the same side of the shaft as the bearings 65 so that when the rods 85 and 86 are in the position as shown in Fig. 5, the shaft may be moved endwise to lock or unlock the clamping members. If the rods 85 and 86 stop so that the projection 142 is above the horizontal line passing through the axis of the shaft, the projection 142 engages the side of the yoked members 140 and 141 to prevent endwise movement of the rods 85 and 86, and thereby prevent locking or unlocking of the clamping members when the bearings 65 are in an inverted position.

If desirable, the spring actuated mechanism for operating the toggle of the clamping mechanism may be supplemented by a fluid pressure device so that the clamping pressure may be materially increased. This may be accomplished, as illustrated in Fig. 8, by admitting fluid under pressure to the pistons 102 and 103 so that they will be moved outwardly to exert a pressure on the lower end of the levers 106 and 107 which will move the rods 85 and 86 inwardly to increase the pressure exerted by the spring 97 on the toggle which operates the clamping jaw. As illustrated in the drawings, a pipe 145 is connected to the cylinder to form a port 146 in the valve 115. This pipe is connected by ports 147 and 148 to the cylinder chambers 149 and 150 in the cylinders 100 and 101 respectively. An exhaust pipe 151 is connected to the valve casing 115 so that fluid may be exhausted from the system. When the valve stem 120 is moved to position the valve pistons as indicated in dotted lines, Fig. 8, at 122 and 123, the fluid under pressure passing through pipe 116, valve chamber 117, is forced through port 146, pipe 145 and ports 147 and 148 into the cylinder chambers 149 and 150 to move the pistons 102 and 103 outwardly and thereby increase the pressure on the toggle joints which clamp the work in place. When the valve stem 120 is moved to position the valve pistons 118 and 119 into the position, as shown in full lines, Figs. 4 and 8, then the port 146 is cut off from the source of fluid pressure and the pistons 102 and 103 are forced towards each other to open the clamping jaws by the fluid pressure entering the chambers 128 and 129. This movement operates to force the fluid from the cylinder chambers 149 and 150 through ports 147 and 148 and through pipe 145, the port 146 and exhaust the fluid through the pipe 151. This fluid pressure may be used to supplement the pressure of the spring actuated mechanism if additional pressure on the work clamping members is desirable.

The operation of this mechanism will be readily apparent from the foregoing disclosure. The operator places the crankshaft 67 in position on the bearings 65, then moves the lever 50 from the position shown in full lines (Figs. 1 and 4) to a position 50a which, as previously described operates to permit fluid to exhaust from the cylinders and the tension of the spring 97 to cause an axial movement of the rods 85 and 86 which in turn operate to lock the shaft rigidly in operating position on the heads 62 and 63. The operator then swings the lever 50 from the position 50a into position 50b, as shown in Figs. 1 and 4, which starts rotation of the work. The operator then turns the wheel feeding mechanism (not shown) to feed the grinding wheel into the work to reduce the crankpin to the desired size. After the pin has been finish ground, the operator removes the grinding wheel from operative engagement with the work and then stops the work rotation by moving the lever 50 from the position 50b into position 50a and may then throw the lever 50 into the position shown in full lines in Fig. 4 to unclamp the work after the grinding has been completed.

Having thus described our invention, what we claim as new and desire to secure by Letters Patent is:

1. A work supporting and rotating mechanism for a grinding machine comprising a rotatable spindle, a work supporting and clamping device mounted on said spindle, means including a clutch to rotate said spindle, means including a fluid pressure device arranged to operate said clamping device, and a manually operable lever arranged to operate said clutch when moved in one direction and to control said fluid pressure device when moved in another direction.

2. A work supporting and rotating mechanism for crankshaft grinding machines comprising a rotatable spindle, means including a clutch to rotate said spindle, means including a clamping jaw movably mounted on the spindle to support the work during rotation thereof, a spring actuated mechanism to move said jaw to clamp the work rigidly in place, means including a fluid pressure device arranged to operate said jaw against the tension of said mechanism to permit removal of the work piece after grinding, and a manually operable lever connected to operate said clutch when moved in one direction and to control said fluid pressure device when moved in another direction.

3. A work supporting and rotating mechanism for grinding machines comprising a rotatable spindle, means including a clutch to rotate said spindle, a work supporting member mounted on said spindle, a clamping jaw cooperating with said member to hold the work in place, mechanism to move said jaw to clamp the work piece rigidly on said member, a fluid pressure mechanism to unlock said jaw to permit removal of the work piece, a valve device to control the fluid pressure mechanism, and means including a single manually operable lever operatively connected to the valve device and to the clutch to control the stopping and starting of the work rotation and the admission of fluid into said device to lock and unlock the work.

4. A work supporting and rotating mechanism for a grinding machine comprising a rotatable spindle, means including a clutch to rotate the spindle, a work supporting member including a clamping jaw and an opposed work bearing member rotatable with the spindle to support a work piece thereon, a fluid pressure actuated device to operate said jaw, manual means to control the clutch and to control said device and clamping jaw, and means associated therewith necessitating movement of the clamping jaw to engage the work before the clutch can be thrown to rotate the spindle.

5. A work supporting and rotating mechanism for a grinding machine comprising a rotatable spindle, means including a clutch to rotate the spindle, means including a clamping jaw and an opposed work bearing member which is rotatable with the spindle to support a work piece thereon, a fluid pressure actuated device to operate said jaw, manual means to control the clutch and to control said device and clamping member, and means associated therewith to prevent the clamping member from being disengaged before the clutch has been thrown to stop the work rotation.

6. A work supporting and rotating mechanism for grinding machines comprising a spindle, a work supporting member mounted on said spindle, a clamping jaw arranged to engage the work piece, a toggle arranged to operate said jaw, and a spring actuated mechanism operatively connected to actuate said toggle to rigidly lock the work in said member.

7. A work supporting and rotating mechanism for grinding machines comprising a rotatable spindle, a work supporting member fixedly mounted on said spindle, a clamping jaw on the supporting member arranged to engage the work piece, a toggle arranged to actuate said jaw, a spring actuated mechanism operatively connected to said toggle to simultaneously operate said jaw to rigidly clamp the work on said member, and a fluid pressure mechanism connected to the toggle to move the clamping jaw to release the work.

8. A grinding machine comprising a slidably mounted table, means including a rotatable spindle on said table for supporting a work piece, a movable clamping jaw revolving with the spindle and cooperating therewith to hold the work piece in place, a fluid pressure device fixedly mounted on said table and connections between said device and the revolving jaw to actuate said clamping jaw.

9. A grinding machine comprising a slidably mounted table, a pair of rotatable spindles on said table, work supporting members fixedly mounted on said spindles and arranged to revolve therewith and to support opposite ends of the work, a clamping jaw cooperating with each member and revolving with the spindle to hold the work piece in place, a spring actuated mechanism connected to move the clamping jaws to grip the work, a fluid pressure mechanism rigidly mounted on said table and a connecting device between the jaw and said fluid pressure mechanism to oppose the spring actuated mechanism and unlock the jaw to permit removal of the work piece after grinding.

10. A work supporting and rotating mechanism for a grinding machine comprising a rotatable spindle, a work supporting member mounted on said spindle, a clamping jaw on said member arranged to lock the work piece rigidly in place, a toggle on said member arranged to operate said jaw, a rod passing through a central aperture in said spindle to operate the toggle and the jaw, and mechanism connected to move said rod.

11. A work supporting and rotating mechanism for a grinding machine comprising a rotatable holder and a movable jaw arranged to clamp against the peripheral portion of an end of the work, means to operate the jaw, and means to prevent operation of the jaw when the holder is in an inverted position from which the work could fall when released.

12. A work supporting and rotating mechanism for a grinding machine comprising a rotatable spindle, a work supporting member fixedly mounted on said spindle, a clamping jaw arranged to engage the work piece, means including a fluid pressure device arranged to operate said jaw, and means to prevent unlocking of said jaw when said member is in an inverted position.

13. A work supporting and rotating mechanism for a grinding machine comprising a rotatable spindle, work supporting members fixedly mounted on said spindle, a clamping jaw arranged to engage the work piece, a spring actuated mechanism to lock said jaw to clamp the work rigidly on said member, manually controlled mechanism to unlock said jaw to permit removal of the work piece after grinding, and means to prevent unlocking of said jaw when said member is in an inverted position.

14. A work supporting and rotating mechanism for a grinding machine comprising a rotatable spindle, a work supporting member fixedly mounted on said spindle, a clamping jaw arranged to engage the work piece, a spring actuated mechanism to lock said jaw to clamp the work rigidly on said member, means including a fluid pressure device arranged to operate said jaw, and means to prevent unlocking said jaw when said member is in an inverted position.

15. A work supporting and rotating mechanism for a grinding machine comprising a rotatable hollow spindle, a work supporting member on said spindle, a clamping jaw opposed to said member and arranged to lock the work piece rigidly in place, a rod passing through said spindle, connections between said jaw and rod to actuate said jaw, and a fluid pressure mechanism connected to move said rod.

Signed at Worcester, Massachusetts, this 2nd day of November, 1928.

HERBERT A. SILVEN.
ALBERT G. BELDEN.